Oct. 13, 1970 J. J. FOLEY, JR., ET AL 3,534,361

PHOTO-OPTICAL ANALOG TO DIGITAL CONVERTER

Filed Jan. 11, 1967 3 Sheets-Sheet 1

INVENTORS
John J. Foley, Jr. &
George G. Caglino

Morse, Altman & Oates
ATTORNEYS

INVENTORS
John J. Foley, Jr. &
BY George G. Cagliuso
Morse, Altman & Oates
ATTORNEYS INVENTORS
John J. Foley, Jr. &
George G. Cagliuso
Morse, Altman & Oates
ATTORNEYS

United States Patent Office 3,534,361

Patented Oct. 13, 1970

3,534,361

PHOTO-OPTICAL ANALOG TO DIGITAL CONVERTER

John J. Foley, Jr., Cambridge, and George G. Cagliuso, Lexington, Mass., assignors, by mesne assignments, to Itek Corporation, Lexington, Mass., a corporation of Delaware Filed Jan. 11, 1967, Ser. No. 608,540
Int. Cl. G08c 9/06
U.S. Cl. 340—347 6 Claims

ABSTRACT OF THE DISCLOSURE

In an analog-to-digital converter involving photo-optical sensing of a relatively movable part having a code track, the photo-optical transducer is a photo-field-effect transistor. Because of the great sensitivity and minute size of this transistor, all of the photo-optical and electronic components can be mechanically combined in a compact housing.

The present invention relates to the digital encoding of analog mechanical position or motion, e.g., of angular or linear analog relationships, and more particularly, to the determination of extremely precise information regarding relative mechanical position or motion. In order to illustrate the present invention, the following discussion will refer primarily to shaft angle encoding by which digital information is generated as a function of angular position and, more particularly, to the determination of extremely precise information in regard to shaft angularity. However it will be understood that linear motion encoding, by which digital information is generated as a function of relative linear position, also is encompassed.

In a typical shaft angle encoder, angular position is determined in conjunction with a coded component (e.g., a disk) that is provided about its periphery with a series of concentric tracks, each having alternative increments (e.g., opaque and clear), which alternately communicate with (e.g., direct radiation toward or obscure radiation from) a bank of suitable sensing components (e.g., photoelectric transducers). Reading in effect, involves sensing a selected grouping of coded increments that extends from track to track (e.g., along a stationary radial line relative to the rotatable disk). Typically, such an encoder includes electro-optical components and electronic components which respectively are enclosed in different housings, the electro-optical components serving to generate primary signals as a function of shaft angle or the like and the electronic components serving to process these primary signals logically to provide a digital output. The different housings have been necessary in order to minimize the number of components immediately adjacent to the sensing location where space often must be conserved and to provide adequate space at a remote location for the logic circuitry, the bulkiness of which varies with the application. The present invention involves a radical simplification of electro-optical and electronic relationships by which, if desired, all electro-optical and electronic components may be enclosed within the same compact housing, which is adapted for direct connection with a shaft or the like.

The primary object of the present invention is to simplify the electro-optical and electronic relationships in an electro-optical analog-to-digital encoder by utilizing, as the electro-optical transducer, a photo-field-effect transistor. Another object of this invention is to utilize photo transistors in a novel carry-over logic circuit to guarantee that the transistions of output signals from different tracks occur simultaneously. By virtue of its minute size and extreme sensitivity, the photo-field-effect transistor enables such a degree of mechanical and electrical simplification that all components may be enclosed in the same compact-housing.

Particular objects of the present invention are: to provide an optical encoder characterized by a coded component provided with at least one clear increment opaque increment track and at least one photo-field-effect transistor in association therewith, and an electronic logic circuit for digitally indicating relative spatial information; to provide an optical encoder of the foregoing type wherein the transducing components and the electronic components are enclosed within a single housing; to provide in such an encoder a novel mechanical format for electro-optical components in the form of a support having thereon a printed circuit pattern to which the photo-field-effect transistors are connected and mounted, and having therethrough openings through which certain photo-field-effect transistors are accessible to light transmitted through an associated code track from an associated light source; to provide for use in an encoder of the foregoing type a novel light source which can be energized radioactively rather than electrically because of the low light level requirement of the system; and to simplify high resolution circuitry in such a system by utilizing encoder structure of the foregoing type.

Other objects of the present invention will in part be obvious and will in part appear hereinafter.

The invention accordingly comprises the components and relationships which are exemplified in the following detailed disclosure, the scope of which will be indicated in the appended claims. For a fuller understanding of the nature and objects of the present invention, reference is to be had to the following detailed description taken in connection with the accompanying drawings wherein:

Figure 2:
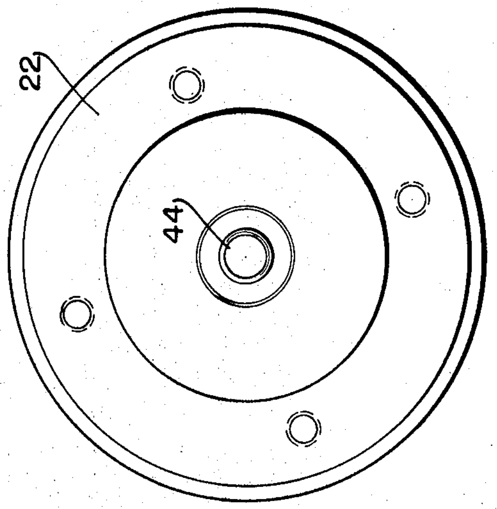
FIG. 2 is a bottom plan view of the encoder of FIG. 1.
Figure 1:
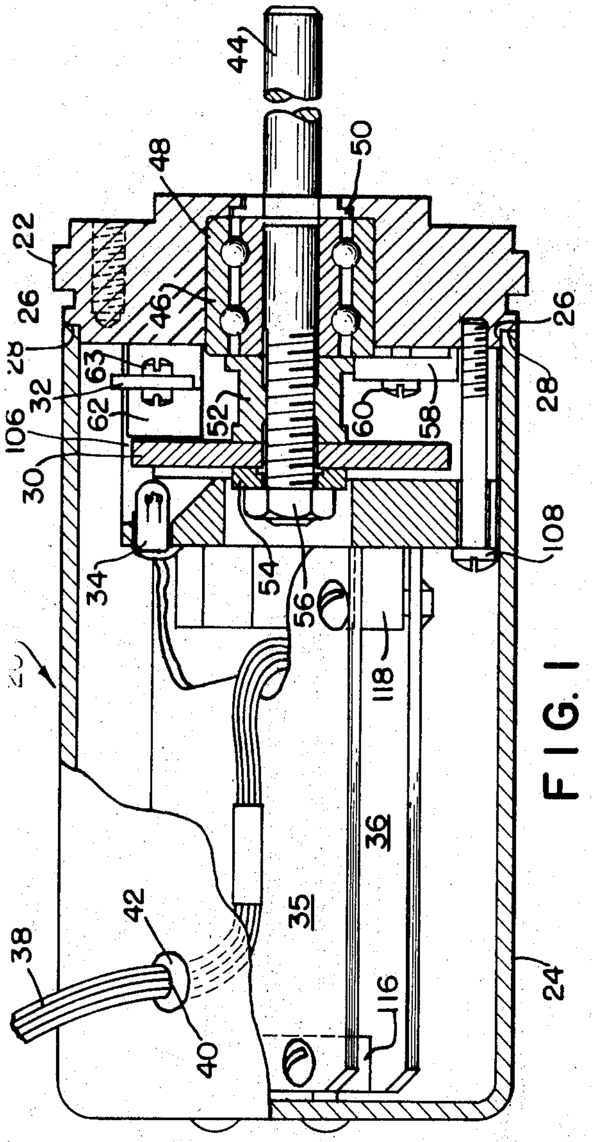
FIG. 1 is a view, partly in plan and partly in cross section, of the components of an encoder embodying the present invention.

With reference first to FIGS. 1 and 2, the illustrated embodiment of the present invention comprises a housing 20, within which all of the electro-optical and electronic components of the encoder are enclosed. Housing 20 includes a generally, disk-shaped base 22 and a bell-shaped cover 24. Base 22 is provided with a peripheral shoulder 26, which is apadpted to seat the peripheral rim 28 at the open end of housing 24. The components within housing 20, all of which will be described in detail below, include a code disk 30, a photo-optical array 32, a lamp array 34 and a pair of circuit boards 35, 36. The former three components 30, 32 and 34 are mounted on base 22. The latter two components 35, 36 are mounted on the closed end of cover 24. A cable 38, which has suitable leads connected to all of the foregoing components, projects through an opening 40 in cover 24 having a grommet 42. The leads of cable 38 within housing 20 have sufficient slack to maintain proper connections with and among the various components when cover 24 is removed from base 22.

Figure 8:
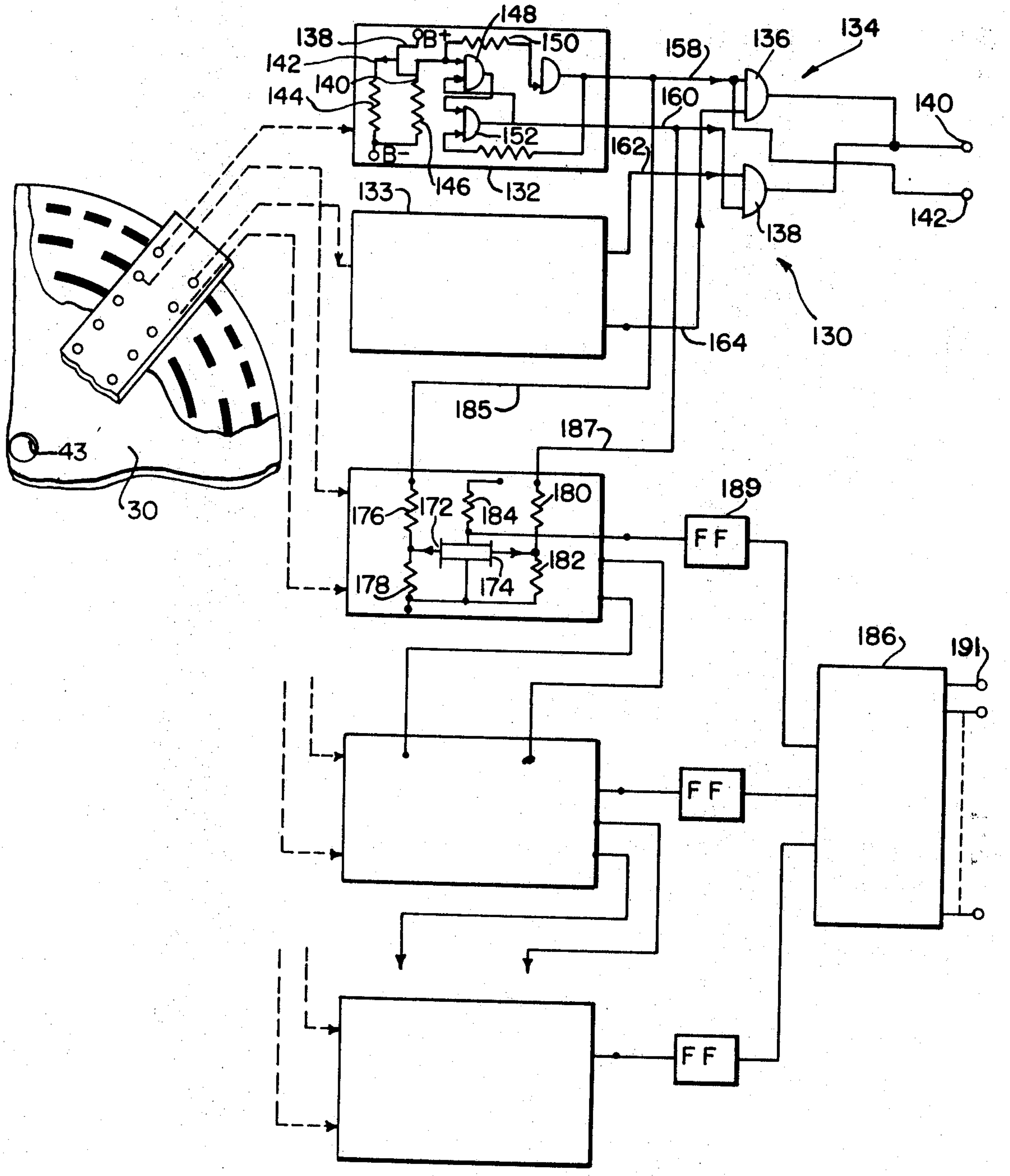
FIG. 8 is an electrical schematic of an exemplary electronic circuit that is incorporated in the encoder of FIG. 1, and includes an exaggerated perspective view of an optical code disk that illustrates certain relationships.

Code disk 30, details of which are shown in FIGS. 1 and 8, is composed of glass having a surface coating, adjacent to photo-optical array 32 and remote from lamp array 34, that is provided by silver halide photography in terms of silvered and clear regions of a gelatin stratum. Disk 30 has a central opening 43 through which projects a shaft 44. Shaft 44 is journaled in a central opening of base 22 by ball bearings 46, 48. A flange 50 that is integral with shaft 44, a spacing collar 52 and a washer 54 serve to position code disk 30 precisely at a predetermined axial location along shaft 44. The inner extremity of shaft 44 is threaded to receive a nut, 56, by which washer 54, disk 30, shoulder 52, bearing 46, bearing 48 and flange 50 are secured. This subassembly is retained within the well of base 22 by a bearing retainer 58, which holds the outer races of bearings 46, 48 in position within the well. Retainer 58 itself is held in position by a screw 60 which projects through an opening in retainer 58 and is turned into a threaded bore in base 22.

Figure 3:
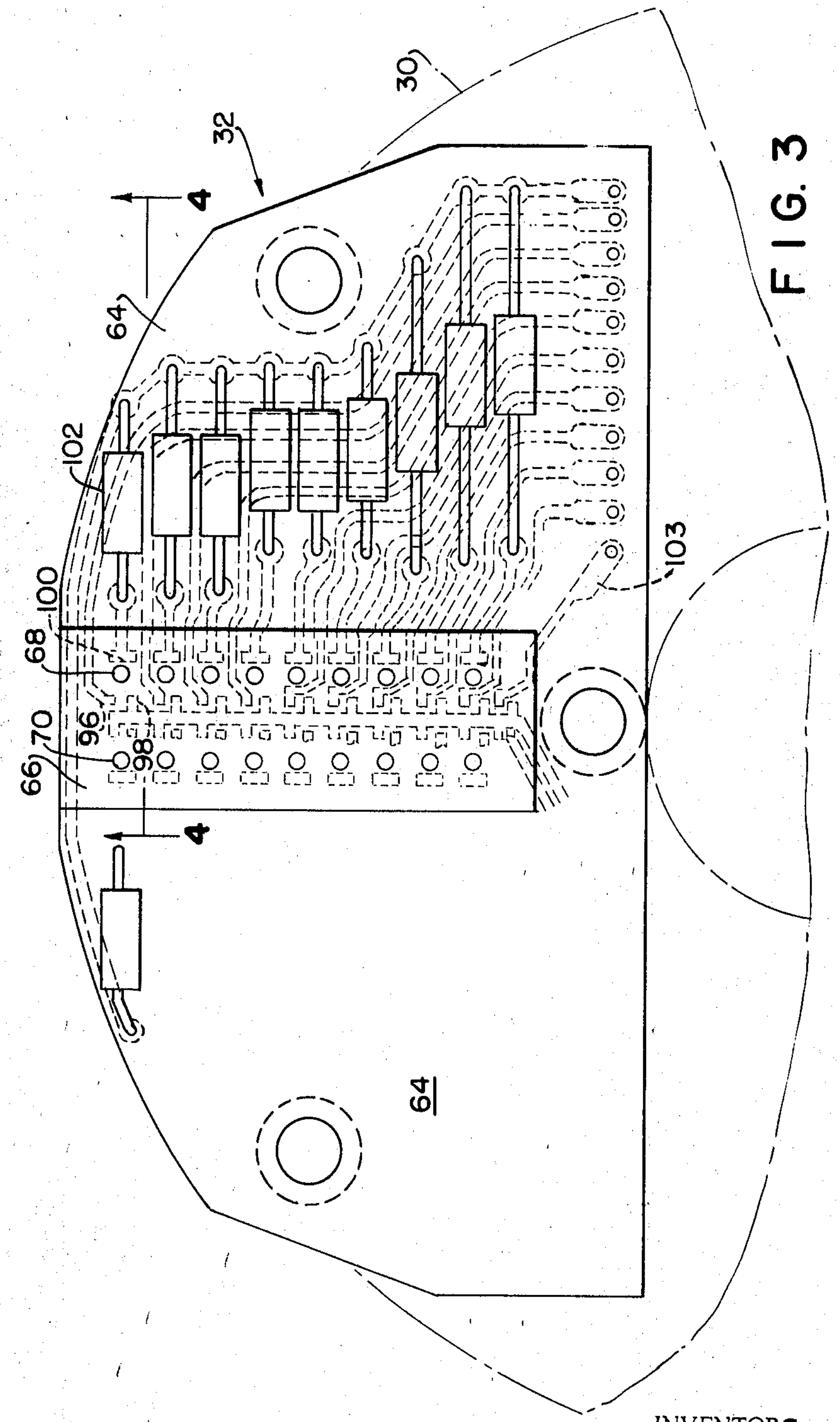
FIG. 3 is a plan view, partly broken away, of a component of the encoder of FIG. 1.

Details of photo-optical array 32 are best shown in FIGS. 1, 3, 4 and 8. Photo-optical assembly 32 is supported on base 22 by a bridge 62, having a pair of legs which are suitably fastened to base 22 by screws (not shown) and a crosspiece (shown cross-hatched) to which the photo-optical array is bolted as at 63. The relationship between the photo-optical array and disk 30 is illustrated in FIG. 3. Array 32 includes a printed circuit board 64 and a so-called station separated board 66. The printed circuit board mounts two columns of photo-field-effect transistors 71 (FIG. 4), nine in each column, at the two columns of holes designated 68, 70. The terminals of each photo-field-effect transistor are suitably soldered to appropriate printed circuit leads. The photo-sensitive areas 73 of these transistors are accessible through corresponding openings in the printed circuit board and in the station separating board. Station separating board 66 and the photo-field-effect transistors are at opposite faces of printed circuit board 64. Station separating board 66 is relatively thick in order that its openings collimate light transmitted from lamps 34 through disk 30 in such a way as to isolate the light into pencils that are optically distinct from each other.

Figure 5:
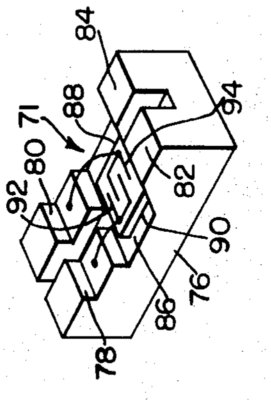
FIG. 5 is a perspective view of a photo-field-effect transistor that is mounted for use in the encoder of FIG. 1.
Figure 4:
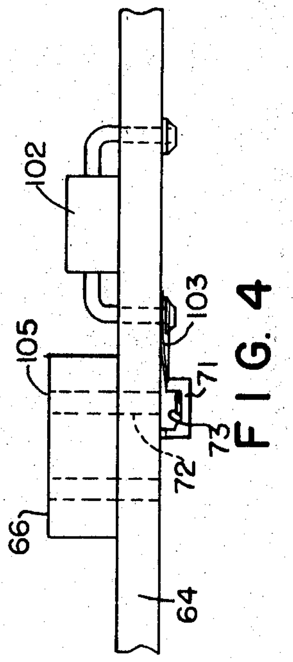
FIG. 4 is a broken away elevation of a part of the component of FIG. 3, the elevation being taken substantially along the line 4—4 of FIG. 3.

As shown in FIG. 5, photo-field-effect transistor 71 is mounted on a ceramic support 76 having a pair of double steps 78, 80 as one end and a pair of single steps 82, 84 at the other end. Double steps 78, 80 include risers between the lower steps and the upper steps. The horizontal faces and the risers of double steps 78, 80 are coated with a conducting film of gold. The risers between the lower steps 78, 80 and the lowermost face 86 of ceramic support 76 are uncoated. Lowermost face 86 and single steps 82, 84, together with the diagonal risers therebetween, also are coated with a conducting film of gold. Cemented to lowermost face 86 by a conducting cement is a semiconductor chip 88. The lowermost face 90 of chip 88 constitutes the gate and the two terminals 92, 94 as the top of chip 88 constitute the source and the drain, respectively of the photo-field-effect transistor. Source 92 and drain 94 are connected respectively to the lower horizontals of double step 78, 80. The upper horizontals of double steps 78, 80 therefore constitute terminals of the source and the drain. The horizontals of upper 82, 84 similarly constitute terminals of the gate. When the horizontals of all steps are connected by conducting cement to positions 96, 98 and 100 of the printed circuit leads, one of which is shown at 103 in FIG. 3, it will be apparent that the photo-sensitive face of chip 88 is positioned in registration with a light collimating aperture, one of which is shown at 105 in FIG. 4. Resistors 102, which are associated with the photo-field effect transistors, are shown connected thereto by printed circuit leads 103, as shown in FIG. 4.

Figure 6:
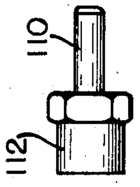
FIG. 6 is a side elevation of an alternative light source for use in the encoder of FIG. 1.
Figure 7:
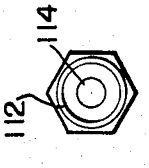
FIG. 7 is an end view of the component of FIG. 6.

In the illustrated embodiment of FIG. 1, three lamps in a row, one shown at 34 are mounted in registration with the rows of openings in station separating board 66 and printed circuit board 64. In other words, one lamp illuminates three pairs of openings, the system being such as to rely on the separation provided by the openings for preventing cross talk between the different transducer channels. Lamps 34 are shown as being of the incandescent type. Because of the low power requirements of photo-field-effect transistors, these lamps can be operated at well below their normal rated levels so that total operating life is maximized. In an alternative embodiment, these incandescent miniature lamps are replaced by light sources of the type shown in FIGS. 6 and 7. Each of these light sources includes a base having a downwardly projecting support pin 110 and an upwardly directed cup 112 that has a window 114 at its windowed extremity. Within the cup is a self luminous chemical, for example a phosphor crystal such as stilbene, and a sealed vial of a chemically inert gaseous radio-isotope, such as krypton 85. Because of the extreme sensitivity of the photo-field-effect transistor, the relatively weak light provided by such a self luminous light source is adequate and almost totally eliminates failure of the light source.

The circuitry to be described below is mounted on circuit boards 35, 36, which as shown in FIG. 1, are bolted to a block 116 and in turn is bolted to the closed cap of cover 24. The inner extremities of board 35, 36 are separated by suitable block 118, which is connected to boards 35, 36 by suitable bolts to provide a rigid construction. This circuitry is shown in association with a fragmentary part of the disk in FIG. 8.

The circuit illustrated in FIG. 8 is of the type in which a pair of analog position signals of the form $E=E_n \sin 2\pi n\theta$ and $E=E_n \cos 2\pi n\theta$, where E is instantaneous amplitudes, $E_n$ is maximum amplitude, $1/n$ is period duration and $\theta$ is instantaneous angular displacement. Channel 130 for the first code track generally includes a pair of photo-field-effect transistor circuits 132, 133 for presenting signals of the foregoing type to the remainder of the channel in square wave form. Circuits 132 and 133 are identical. In each, the drain 138 is connected to B+; and the gate 142 and source 140 are connected to B− respectively through a pair of resistors 144, 146. The output is applied from the source to an integrated circuit arrangement having first, second and third amplifiers 148, 150 and 152. One of the sinusoidal wave forms is applied to first amplifier 148 as well as to second amplifier 150. The output of first transistor 148 is applied to third amplifier 152. The outputs of first and second amplifiers 148, 150 are applied to third amplifier 152. Coupling is effected through a pair of resistors 154, 156 to provide a regenerative Schmidt trigger function. The arrangement is such that circuits 132, 133 provide quadrature signals at 158, 160, 162, 164.

These quadrature signals are applied to an exclusive OR logic network 134, having a pair of gates 136, 138, which operate to produce an output signal at 140 which corresponds to the least significant digit. The next-least significant digit is taken from terminal 158.

In considering the information provided by the first track, it is apparent that although a particular portion of a single incremental cycle (a single adjacent opaque increment, clear increment pair) is designated, the identity of no particular one of the multiplicity of incremental cycles of the first code track is designated. Assuming as in the present case a ten digit output, having established the least significant digits as above, it would be conceivable to utilize eight isolated additional tracks in natural binary code. However, possible errors resulting from inaccuracies in the various tracks can be corrected as follows. It is a property of natural binary code that whenever a change in a more significant digit occurs, it is accompanied by a change in a less significant digit. In the encoder field, an encoder track with more clear increment-opaque increment subdivisions is known as a less significant track, and an encoder track with less clear increment-opaque increment subdivisions is known as a more significant track. This terminology has been adopted because a more significant track renders more information on the absolute position which the encoder is measuring. Stated generally, when several digital indications are designed to change at any given time in logic circuitry, accurate operation of this circuitry requires that they do change at that given time or that some compensatory or carry-over logic circuitry be provided to obviate any unintended change. In other words, as will be discussed below in detail, since it is impossible to provide code tracks in which, as a practical matter, exact coincidence of leading and lagging edges exists, appropriate carry-over logic circuitry often is desirable.

The carry over logic circuitry of the illustrated system operates to guarantee that a transition in the signal from the second track occurs simultaneously with a corresponding transition in the first track, a transition in a signal in the third track occurs simultaneously with a corresponding transition in the second track, and so on. Electronically, this guarantee is effected, for illustration, by logically selecting either the lead or lag photo-field-effect transistors associated with the second track according to whether the next-to-least significant digit from the fine track is a ZERO or a ONE. Such a carry-over logic system guarantees that the transitions in the second track occur simultaneously with the transitions from the first track.

As shown, this carry-over logic circuitry involves a pair of lead-lag, photo-field-effect transistors 172, 174 which transduce the two pencils of light from the second track. These transistors are associated with suitable voltage dividing and biasing resistors 176, 178, 180, 182, 184 and are powered by B+ and B− as indicated. The arrangement is such that the signals generated by photo-field-effect transistors 172, 174 are combined with signals at 185, 187 from the first track to ensure that at the instant of the ONE to ZERO transition of the first track, the corresponding transition of the second track output occurs. The remaining code tracks of the illustrated system, which are seven in number, are associated, together with the output of the second track, with flip-flop arrangement 189 and readout arrangement 186. Read-out arrangement 186 includes indicators 191 for eight digits. At any particular shaft angle, each indicator produces a ZERO or ONE binary output. Thus the nine tracks of the code disk present alternate opaque and clear increments, one pair of opaque and clear increments on any track constituting an incremental cycle in that track. Any inner code track channel is such that, the next outer code track has twice as many incremental cycles as the inner code track and a transition (from clear to opaque increment or vice versa) in an inner code track necessarily is accompanied by a transition in the outer code track. The arrangement is such that any transition on any inner track is made to be coincident with a corresponding transition in the outmost track. Also the number of cycles in the next outmost or second track is one half (or some other arbitrary fraction) the number of cycles in the first code track.

The present invention, in operation, thus provides a novel direct reading disk encoder of unprecedented simplicity and accuracy. The photo-field-effect transistors serve to simplify the electronic circuitry as well as the mechanical structure and provide extreme accuracy notwithstanding the enclosure of the entire system in a single housing.

What is claimed is:

1. An analog to digital encoder comprising:

(a) a housing;

(b) code track means having at least a first track and a second track, each having a series of opaque increment, clear increment cycles, said second track having fewer of said series of cycles and being more significant than said first track;

(c) said housing and code track means being mounted for movement relative to each other;

(d) illumination means for directing radiation toward said code track means;

(e) photo transistor means, including a pair of photo transistors, each having a drain, a source and a gate, in registration with said second track, for obtaining an output signal for each track;

(f) carry-over logic means connected to the output signal from said photo transistor means for the first track;

(g) digital logic means, including interconnecting means for said pair of photo transistors, responsive to said carry-over logic means for ensuring that transitions in signals from said first and second tracks occur simultaneously when such simultaneous transitions are proper, said interconnecting means including means for directly connecting said sources of said pair to each other, means for directly connecting said drains of said pair together, and said carry-over logic means is connected to said gates of said pair; and (h) readout means responsive to said digital logic means to indicate positional information relative to said housing and said code track means.

2. Apparatus as set forth in claim 1 wherein said encoder is a unitary structure and said housing encloses said code track means, said photo transistor means, said illumination means, said carry-over logic means, said digital logic means, and said readout means.

3. Apparatus as set forth in claim 1 wherein:

(a) said code track means has a plurality of different tracks, each track being of a different significance with a different amount of said series of cycles;

(b) said photo transistor means has a plurality of pairs of photo transistors, each pair being in registration with one of the more significant tracks;

(c) said carry-over logic means has connections with the output signals from said photo transistor means for each of the lesser significant tracks; and (d) said digital logic means includes interconnecting means for each pair of photo transistors and ensures that transitions in signals from each of the lesser significant tracks and each of the more significant tracks occur simultaneously when such simultaneous transitions are proper.

4. Apparatus as set forth in claim 3 wherein said encoder is a unitary structure and said housing encloses said code track means, said photo-field-effect transistor means, said illumination means, said carry-over logic means, said digital logic means, and said readout means.

5. Apparatus as set forth in claim 1 wherein each photo transistor is a photo-field-effect transistor.

6. Apparatus as set forth in claim 3 wherein each photo transistor is a photo-field-effect transistor.

(References on following page)

References Cited

UNITED STATES PATENTS

| | | | |
|---|---|---|---|
| 2,910,593 | 10/1959 | Laing et al. | 250—77 |
| 3,009,141 | 11/1961 | Little et al. | 340—347 |
| 3,043,962 | 7/1962 | Jones | 340—347 X |
| 3,196,431 | 7/1965 | Papelian | 340—347 |
| 3,247,505 | 4/1966 | Coyle | 340—347 |
| 3,281,830 | 11/1966 | Brean | 340—347 |
| 3,358,279 | 12/1967 | Chope | 340—347 |
| 3,366,802 | 1/1968 | Hilbiber | 307—311 X |

MAYNARD R. WILBUR, Primary Examiner

M. K. WOLENSKY, Assistant Examiner